United States Patent
Bullis

(10) Patent No.: US 10,752,297 B1
(45) Date of Patent: Aug. 25, 2020

(54) EXTENDABLE SAFETY RAILS FOR TRAILER

(71) Applicant: Rick Bullis, Millers Creek, NC (US)

(72) Inventor: Rick Bullis, Millers Creek, NC (US)

( * ) Notice: Subject to any disclaimer, the term of this patent is extended or adjusted under 35 U.S.C. 154(b) by 0 days.

(21) Appl. No.: 15/847,043

(22) Filed: Dec. 19, 2017

(51) Int. Cl.
   *B62D 33/027* (2006.01)
   *B62D 33/037* (2006.01)
   *B62D 63/08* (2006.01)

(52) U.S. Cl.
   CPC ......... *B62D 33/0276* (2013.01); *B62D 63/08* (2013.01)

(58) Field of Classification Search
   CPC ............................ B62D 33/0276; B62D 63/08
   USPC ...................................................... 296/26.04
   See application file for complete search history.

(56) References Cited

U.S. PATENT DOCUMENTS

| | | | |
|---|---|---|---|
| 3,365,230 A | 1/1968 | Langdon | |
| 4,423,899 A | 1/1984 | Langmead | |
| 5,195,767 A | 3/1993 | Des Roches | |
| 6,332,637 B1 | 12/2001 | Chambers | |
| 6,378,893 B1 | 4/2002 | Jager | |
| 6,592,162 B2 * | 7/2003 | Felix | B62D 33/0276 296/3 |
| 7,543,870 B2 | 6/2009 | Schwartz | |
| 8,690,219 B1 * | 4/2014 | Calvert | B60P 7/15 296/3 |
| 8,740,277 B1 * | 6/2014 | Al-Qahtani | B62D 33/0207 296/3 |
| 8,905,280 B2 * | 12/2014 | Martin | B60R 9/00 224/405 |

FOREIGN PATENT DOCUMENTS

CA          2668328 A1     12/2009

* cited by examiner

*Primary Examiner* — Joseph D. Pape
*Assistant Examiner* — Dana D Ivey
(74) *Attorney, Agent, or Firm* — Ference & Associates LLC

(57) ABSTRACT

An extendable safety rail assembly for an utility trailer is provided. The assembly includes: a plurality of extendable side rails, provided with a set of horizontally tubular bars rails braced along the length thereof for rigidity on stationary sleeve assemblies, terminating with a set of vertical end posts at each rail end, each post adaptable for vertical movement slidably fitting inside suitably sized sleeves of stationary sleeve assemblies mounted onto trailer sides; and a locking mechanism is adapted to lock at least one of extendable side rail of the plurality of extendable safety rails at different heights.

4 Claims, 3 Drawing Sheets

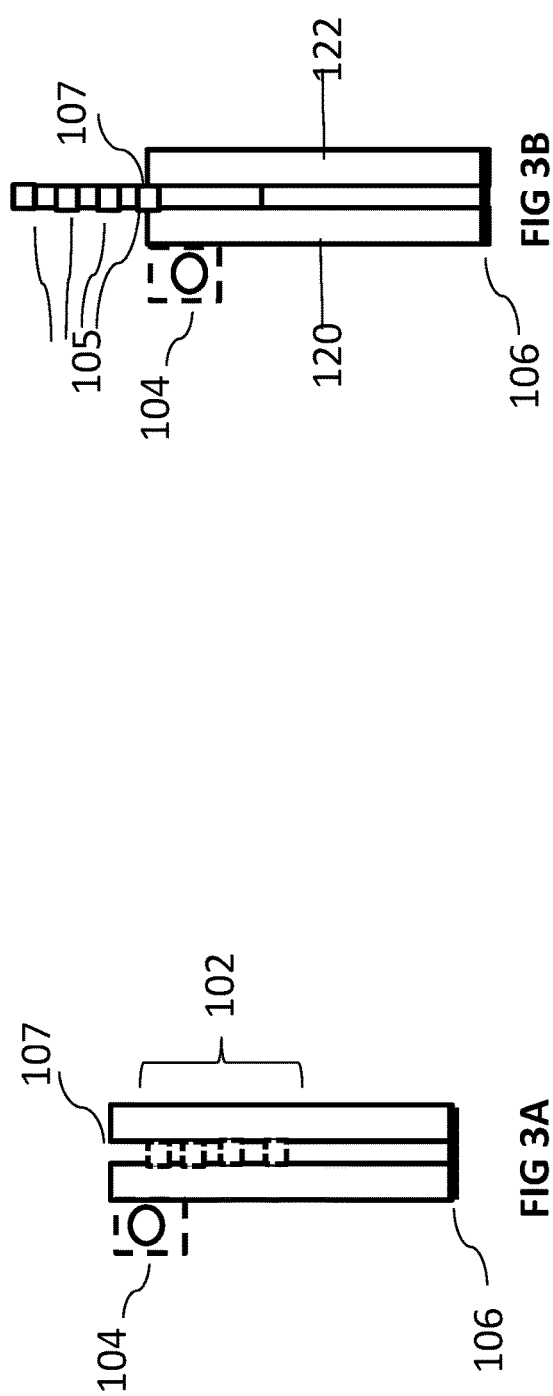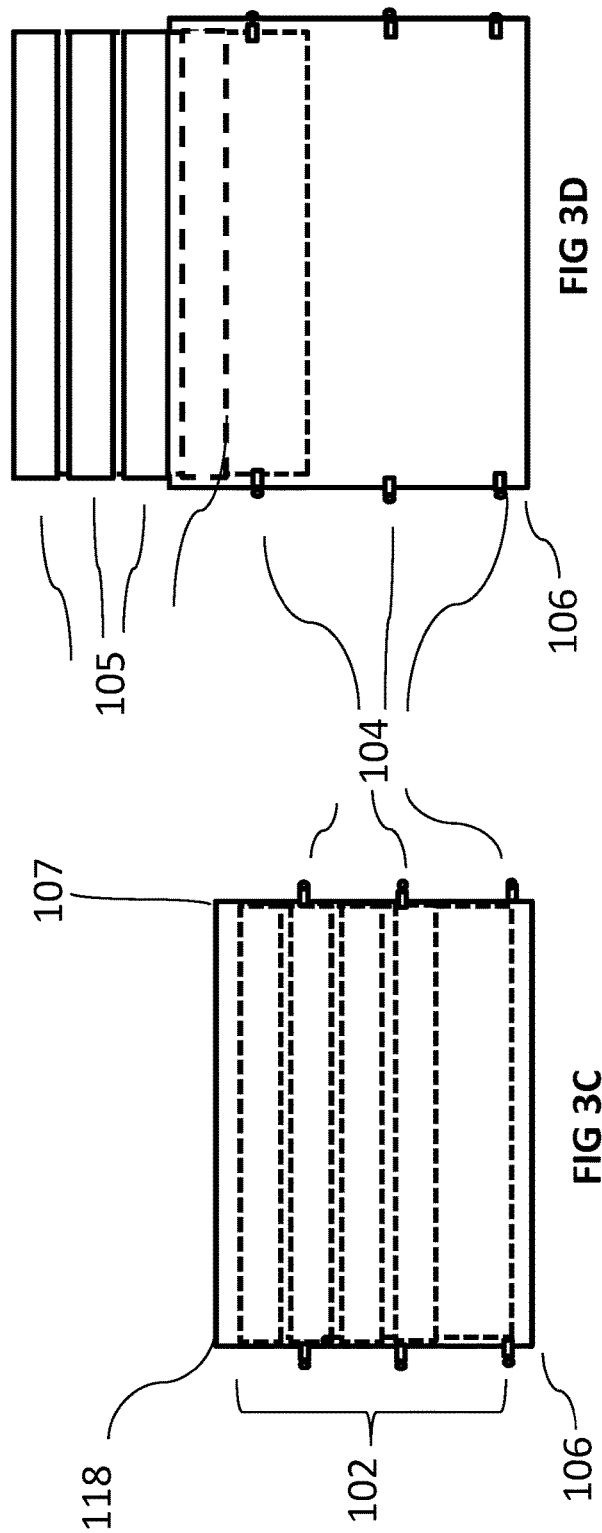

US 10,752,297 B1

EXTENDABLE SAFETY RAILS FOR TRAILER

BACKGROUND

Technical Field

The invention herein generally relates to extendible safety rails, and more particularly to the extendable safety rails for a utility trailer.

Description of the Related Art

Trailers are adapted to carry different kinds of loads from one location to another. Conventionally, trailers are equipped with at least two rails for supporting the loads. The rails are fixed in height, so that the size and type of loads in the trailer is limited. Loading of the loads into the trailer is also cumbersome.

Conventionally, it has been customary to attach a piece of plywood to a trailer rail directly to the surface of a trailer. Generally this is not applicable to because of size and type limitations. To prevent accidents and falling of loads, new ideas have been advanced by a device of the present invention. Accordingly, there is a need for a trailer with extendable rails for safely and securely loading various sizes and types of loads.

SUMMARY

Briefly stated, in accordance with one aspect of the present invention, a side extendable safety rail is provided for use in the trailer and is adaptable to height, so that the different size of loads loading in the trailer are safely positioned at both sides of the trailer. The extendable safety rail includes an elongated guard portion of a predetermined length which includes at least a pair of horizontally spaced tubular rails of preferably rectangular, square or cylindrical configuration, secured in parallel to vertical posts at each opposite guard end so as to slidably move vertically inside appropriate sleeves which are permanently secured to the carrying portion of the trailer. Additionally, a set of fastening mechanisms are disposed inside the sleeves to hold the vertical posts and define the height of the rail guard while extended. Optionally, a set of solid rubber blocks or other vibration dampening device may be secured to appropriate brackets to insure protection of the retracted rail guard from vibration and service abuse.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIGS. 3A-D illustrate an example embodiment.

DETAILED DESCRIPTION OF PREFERRED EMBODIMENTS

Figure 1:
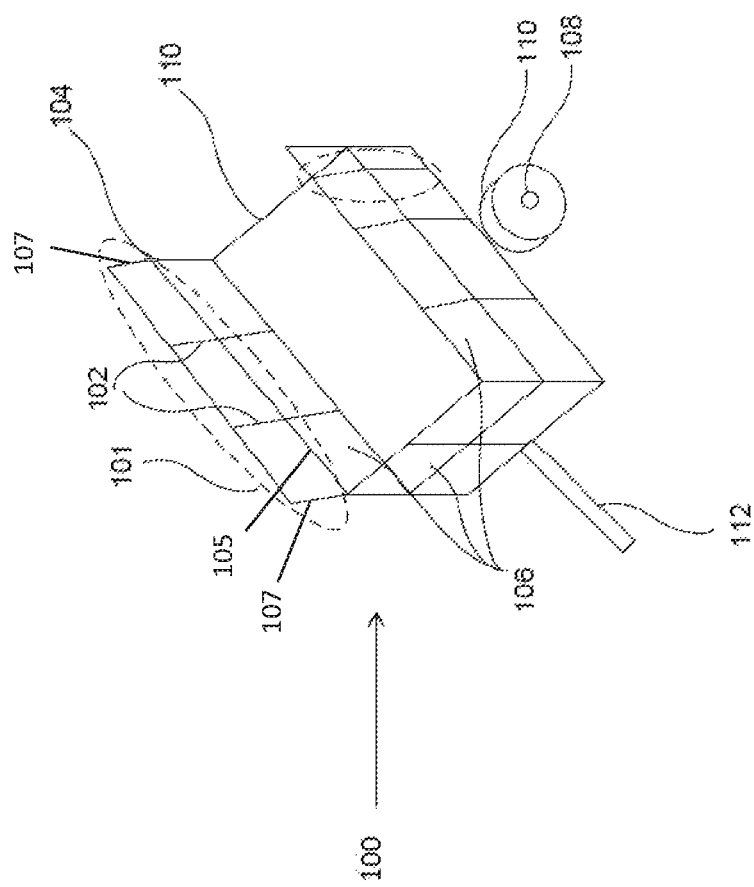
FIG. 1 illustrates a perspective view of an utility trailer with an extendable safety rail assembly for trailers according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Conventionally, utility carts (or open trailers) towed behind vehicles have not been quickly and easily adapted for various sized, weights and dimensions of loads. Thus, pulling such a load has been prone to certain risks such as the load escaping, shifting, or falling out. By providing a flexible means for raising, lowering, and locking in place protective side rails, the inventor has added such flexibility and additional utility to a conventional utility cart. The fully adjustable side rails described here may be used to prevent brush or lawn mowers or any type of load from escaping from the utility cart. Further, the adjustable side rails may be manufactured into the utility cart or they may be added later. The fully adjustable side rails may be accomplished through a combination of slidably extending (telescoping) inner and outer support, polls with locking mechanisms, or may be accomplished by providing a hollow side wall on the utility trailer in which the extension is disposed within the side wall when not in use and may slide out and be adjusted and set in place using locking mechanisms.

Referring now to the drawings, and more particularly to FIGS. 1 through 3A and 3B, where similar reference characters denote corresponding features consistently throughout the figures, there are shown preferred embodiments.

FIG. 1 illustrates a perspective view of a utility trailer 100 with an extendable safety rail assembly 101 for trailers according to an embodiment herein. The extendable safety rail assembly 101 comprises a plurality of extendable side rails 102 that are adapted to slide over side walls of the utility trailer 100 and a locking mechanism 104. At least one of the plurality of extendable side rails 102 are provided with a set of horizontal tubular bar rails 105 braced along the length thereof for rigidity on stationary sleeve assemblies, terminating with a set of vertical end posts 107 at each rail end, each post 107 adaptable for vertical movement slidably fitting inside suitably sized sleeves of stationary sleeve assemblies mounted onto trailer sides 106. The locking mechanism 104 is adapted to lock the at least one of a plurality of extendable side rails 102 at different heights. In one embodiment, the utility trailer 100 further includes wheels 110 mounted on an axle 108, and a hitch 112 attached to a front side of the trailer sides 106.

Figure 2:
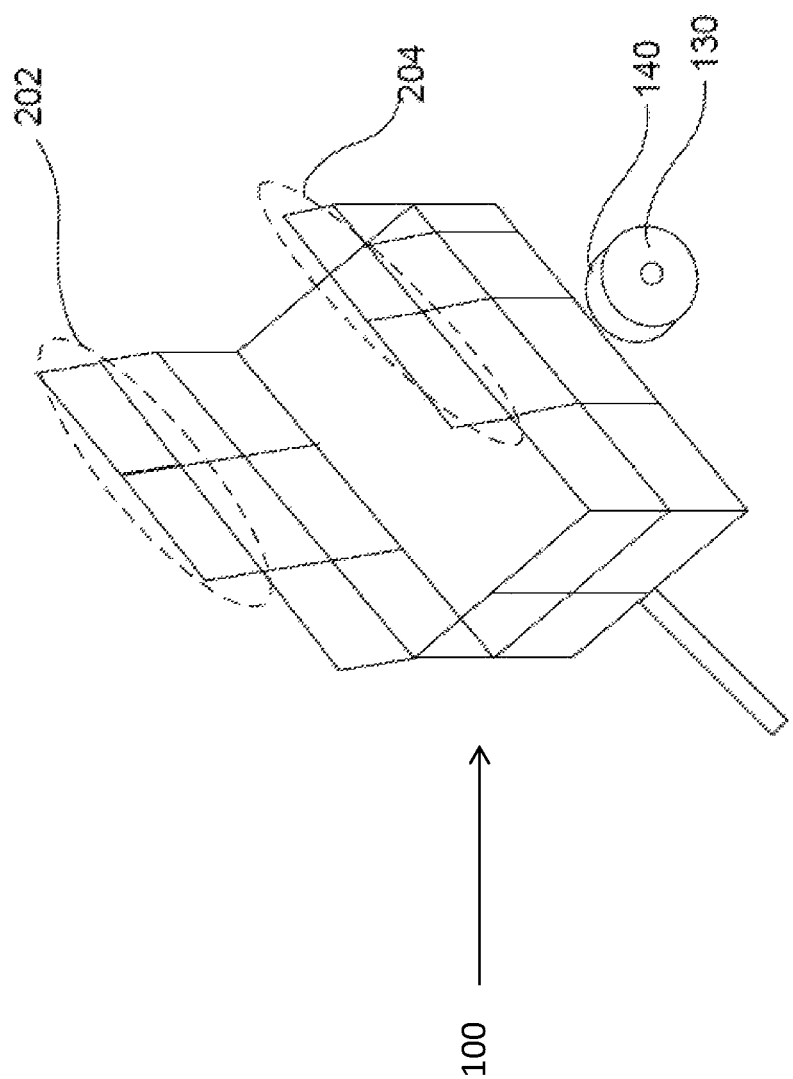
FIG. 2 illustrates a perspective view of the utility trailer of FIG. 1 according to an embodiment herein.

FIG. 2 illustrates a perspective view of the utility trailer 100 of FIG. 1 according to an embodiment herein. In one embodiment, the one or more extendable side rails 102 comprises a first extendable rail 202, and a second extendable rail 204. The first extendable rail 202 is attached to a first stationary sleeve assembly (not shown in FIG. 2) attached to the utility trailer 100. The first extendable rail 202 is adapted to slide over a first side wall. The second extendable rail 202 is attached to a second stationary sleeve assembly (not shown in FIG. 2) attached to the utility trailer 100. The second extendable rail 204 is adapted to slide over a second side wall.

In one embodiment, the first stationary sleeve assembly and second stationary sleeve assembly comprise guides to slide the first extendable rail 202 and the second extendable rail 204 respectively. The stationary sleeve assemblies may be welded thereto or secured permanently to the trailer base plate or permanently fastened to the utility trailer 100. In one embodiment, the first stationary sleeve assembly and second stationary sleeve assembly comprise guides to slide the first extendable rail 202 and the second extendable rail 204 respectively.

FIGS. 3A-D illustrate an example embodiment. FIG. 3A is a side view of an example embodiment wherein in the extendible rail 102 (or 202 at FIGS. 1 and 2) is lowered below the trailer side 106. FIG. 3B is a side view of an example embodiment wherein the extendible rail 102 is raised up above trailer side 106 and locked in place by locking mechanism 104. FIG. 3C is a front view of an example embodiment wherein in the extendible rail 102 is lowered below the trailer side 106. FIG. 3D is a front view of an example embodiment wherein the extendible rail 102 is raised up above trailer side 106 and locked in place by locking mechanism 104. Each extendible side rail assembly 101 may comprise a plurality of extendible side rails 102. Each extendible side rail 102 may comprise a horizontal set of horizontal tubular bar rails 105. Each of the horizontal tubular bars may be connected to a right vertical end post 107 and a left vertical end post 118 and bookended by a right vertical support post 120 disposed within a hollow side wall of a utility trailer and a left vertical support post 122 disposed within the hollow side wall 106 of a utility trailer. The right vertical support post 120 may be parallel to the right vertical end post 107 and the left vertical support post 122 may be parallel to the left vertical end post 118. The plurality of extendable side rails may be housed within a hollow side wall 106 of the utility trailer 100 and may be configured to vertically move out of the hollow side wall 106. The extendible side rail 102 may be extended vertically to a desired height. At least one locking mechanism 104 may be disposed within the hollow side wall 106 and adapted to secure at least one of the plurality of extendable side rails 102 at a height above the side wall by sliding vertically through the hollow wall 106 and either the right vertical end post and the right vertical rail support post or the left vertical end post and the left vertical rail support post.

Non-limiting examples of locking mechanisms that may be used include, but are not limited to, screws, t-screws, castle nuts and cotter pins, spring locks, lock nuts and bolts, and clamps. Other locking mechanisms may be used as well. In one embodiment, the first extendable rail and the second extendable rail is made of rigid materials. The locking mechanism 104 includes a first locking mechanism to lock the first extendable rail 202 in a height, and a second locking mechanism 104 adapted to lock the second extendable rail 204.

One embodiment describes an extendable safety rail assembly for a utility trailer, comprising: a plurality of extendable side rails, provided with a set of horizontally oriented bars braced along the length thereof for rigidity on stationary sleeve assemblies, terminating with a set of vertical end posts at each rail end, each post adaptable for vertical movement slidably fitting inside suitably sized stationary sleeve assemblies mounted onto trailer sides; and at least one locking mechanism adapted to secure at least one of the plurality of extendable side rails at different heights.

Optionally, the extendable rail assembly may comprise: a first extendable rail attached to a first stationary sleeve assembly attached to the utility trailer, wherein the first extendable rail is adapted to slide over a first side wall; and a second extendable rail attached to a second stationary sleeve assembly attached to the utility trailer, wherein the second extendable rail is adapted to slide over a second side wall.

Optionally, the first stationary sleeve assembly and second stationary sleeve assembly may comprise grooves or guides to receive the first extendable rail and the second extendable rail respectively.

Optionally, the locking mechanism may comprise a first screw adapted to lock the first extendable rail in a height, and a second screw adapted to lock the second extendable rail. Other types of locking mechanisms are contemplated as well.

Optionally, the first extendable rail and the second extendable rail may be made of rigid materials. Non-limiting examples of such materials may include, but not be limited to, steel, iron, and aluminum. A rigid plastic or polymer might also be used as desired.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. An extendable safety rail assembly for a utility trailer, comprising:
    a plurality of extendable side rails, each of the plurality of extendable side rails comprising a right vertical end post and a left vertical end post and at least one horizontally oriented bar integrated along the length of the extendable side rail thereof and connected to the right vertical end post and the left vertical end post and bookended by a right vertical support post disposed within a hollow side wall of a utility trailer and a left vertical support post disposed within the hollow side wall of a utility trailer;
    wherein the right vertical support post is parallel to the right vertical end post and the left vertical support post is parallel to the left vertical end post;
    wherein each of the plurality of extendable side rails is housed within the hollow side wall of the utility trailer and is configured to vertically move out of the hollow side wall; and
    wherein the extendible side rail may be extended vertically to a desired height; and
    wherein at least one locking mechanism is disposed within the hollow side wall and adapted to secure at least one of the plurality of extendable side rails at a height above the side wall by sliding vertically through the hollow wall and either the right vertical end post and the right vertical support post or the left vertical end post and the left vertical support post.

2. The extendable safety rail assembly claim 1, wherein the plurality of extendable side rails comprise a first extendable side rail and a second extendable side rail and wherein the side wall comprises a first side wall and a second side wall;
- wherein the first extendable side is adapted to slide above the first side wall; and
- wherein the second extendable side rail is adaptable to slide above the second side wall.

3. The extendable safety rail assembly of claim 1, wherein the plurality of extendable side rails are composed of rigid materials.

4. An extendable safety rail assembly for a utility trailer, consisting of:
- a plurality of extendable side rails, each of the plurality of extendable side rails comprising a right vertical end post and a left vertical end post and at least one horizontally oriented bar integrated along the length of the extendable side rail thereof and connected to the right vertical end post and the left vertical end post and bookended by a right vertical support post and a left vertical support post;
- wherein the right vertical support post is parallel to the right vertical end post and the left vertical support post is parallel to the left vertical end post;
- wherein the right and left vertical support posts are affixed to the utility trail;
- wherein the right vertical end post is disposed within the right vertical support post and the left vertical end post is disposed within the left vertical support post;
- wherein the extendible side rail may be extended vertically to a desired height by sliding the extendible side rail up;
- wherein at least one locking mechanism is disposed within the right vertical support post or the left vertical support post;
- wherein the locking mechanism is adapted to secure at least one of the plurality of extendable side rails at a height above a side wall of the utility trailer by sliding the locking mechanism vertically through the right vertical support post and the right vertical end post or the left vertical support post and the left vertical end post.

* * * * *